May 30, 1939.    O. J. HUELSTER ET AL    2,160,146
DUPLEX SNAP FASTENER ATTACHING MACHINE
Filed July 10, 1937    3 Sheets-Sheet 1
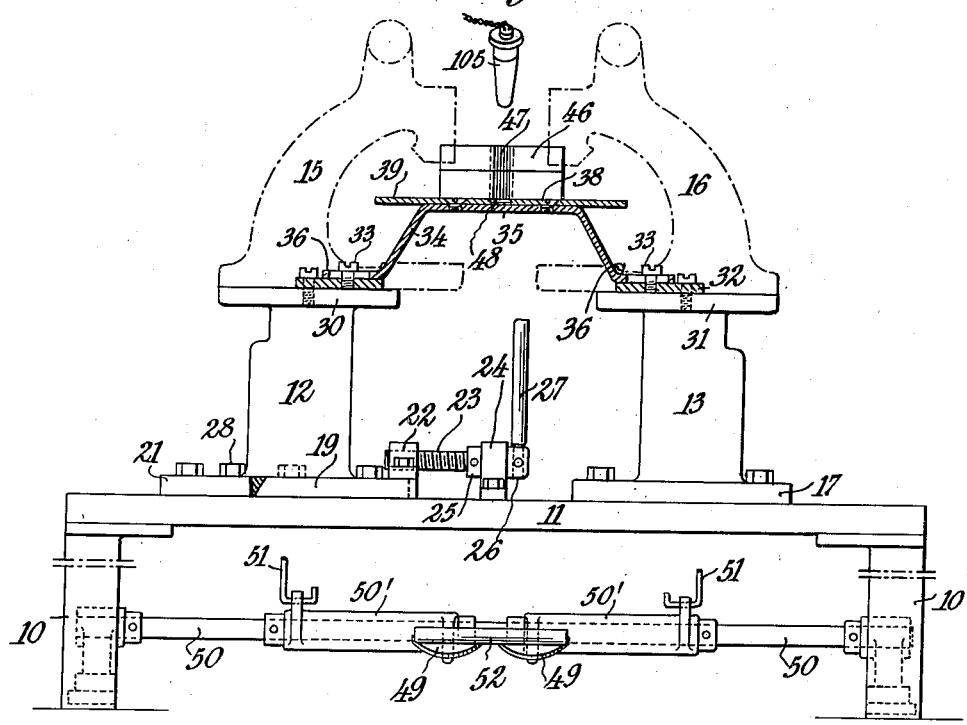
Fig. 1.
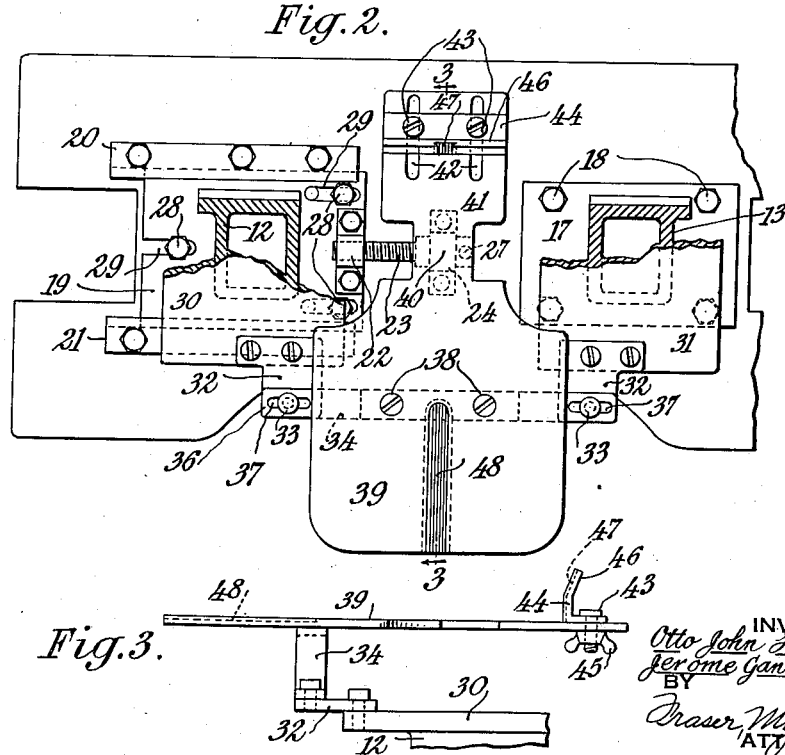
Fig. 2.
Fig. 3.
INVENTORS:
Otto John Huelster and
Jerome Ganierre Wolff,
BY
Fraser, Myers & Manley
ATTORNEYS.

May 30, 1939.  O. J. HUELSTER ET AL  2,160,146
DUPLEX SNAP FASTENER ATTACHING MACHINE
Filed July 10, 1937   3 Sheets-Sheet 2

May 30, 1939.  O. J. HUELSTER ET AL  2,160,146
DUPLEX SNAP FASTENER ATTACHING MACHINE
Filed July 10, 1937    3 Sheets-Sheet 3
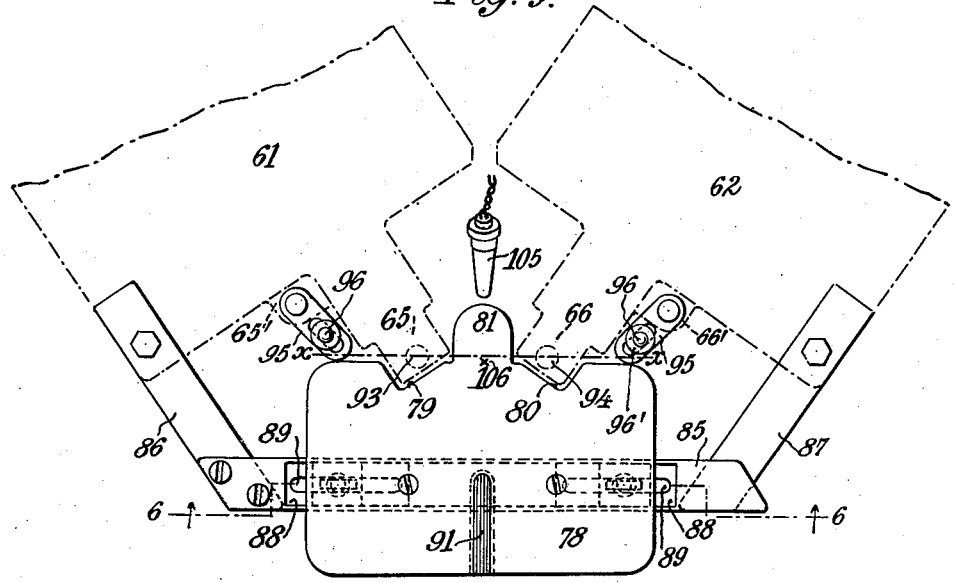
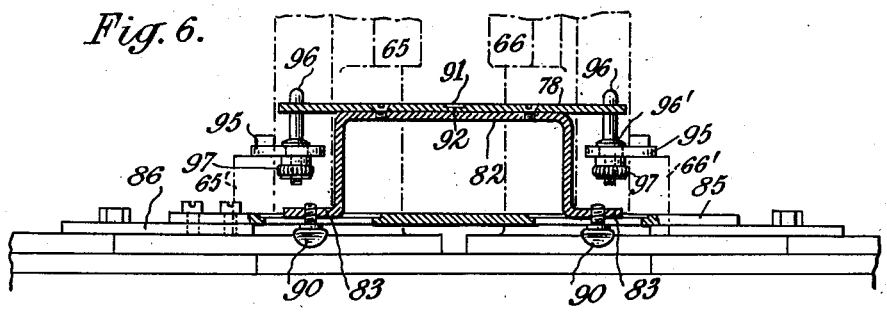
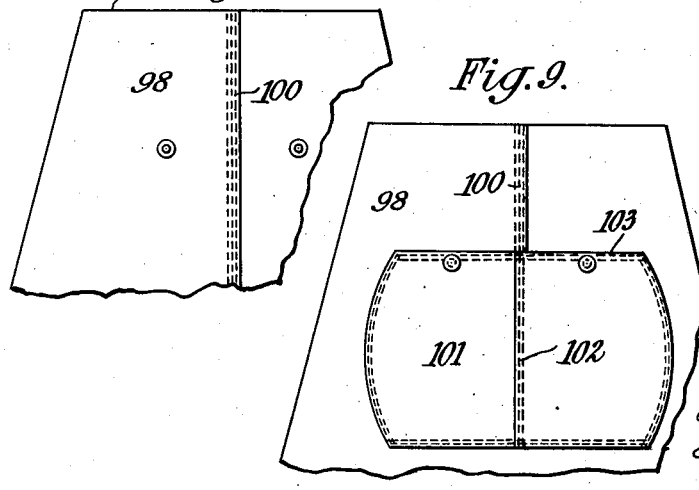
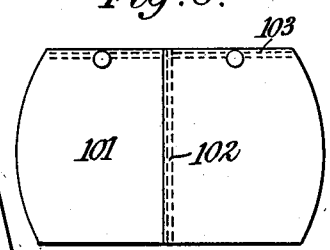

Patented May 30, 1939

2,160,146

UNITED STATES PATENT OFFICE 2,160,146

DUPLEX SNAP FASTENER ATTACHING MACHINE

Otto John Huelster and Jerome Ganierre Wolff, Waterbury, Conn., assignors to Scovill Manufacturing Company, Waterbury, Conn., a corporation of Connecticut Application July 10, 1937, Serial No. 152,928

6 Claims. (Cl. 218—0.5)

The present invention relates to a machine for simultaneously securing at a fixed distance apart, two snap fastener elements (sockets or stud elements) to a carrier fabric. A particular application of the present invention is to be found, for example, in uniting an overall bib pocket of the wide or double type having two spaced-apart snap fasteners to an overall bib having correspondingly spaced-apart complemental snap fastener elements. The use of snap fasteners in such relation has created a definite problem in the art because of the fact that on the finished product the socket elements of the fasteners must line up absolutely accurately with the stud elements of the fastener in order to function properly and provide a smooth-lying pocket construction.

According to conventional practice, before securing the fastener elements (both the socket and the stud elements) to their respective overall bib and pocket fabrics, the points on the fabrics whereat the fastener elements are to be secured must be first marked with chalk or by an awl hole or in some other manner, and the fastener elements then secured at said marked points. This procedure gives rise to various sources of error, firstly in the marking of the fabrics; and secondly, in accurately securing the fastener elements at the marked points, in both of which operations the human element comes into play, and, under working conditions where speed in production is an important factor, these sources of error are of primary importance. It will also be apparent that even the slightest error in securing either the studs or the sockets at the exact points intended for them will cause the failure of the pocket to line up properly and thus provide an unsatisfactory and unsightly pocket construction on the garment.

In overalls, for example, the spacing between the two fastener elements on a pocket may be any arbitrary distance, from about three inches to five inches, or more. In view of these variations, which, in part, are proportional to the size of the garment, it has been impracticable to set these fasteners by duplexing the conventional fastener setting machines because in placing such machines in side by side relation, the minimum distance obtainable between the setting stations of two machines was in excess of five inches. Moreover, even if it had been possible to obtain the desired result by so placing the conventional machines, the problem of varying the setting distances between two machines would require a complete shifting of at least one of the machines, a procedure which would be highly impracticable.

The present invention seeks to overcome the difficulties and objections inherent in the present machines and to so modify conventional practice and the machines used therein as to solve the problem of economically and efficiently simultaneously setting two spaced-apart fastener elements.

To accomplish this we have so arranged a pair of fastener setting machine heads that the noses or setting stations thereof can be readily adjusted with respect to one another to definitely fix the distance between the setting anvils. In addition thereto we have provided a table on which the bib of the overall, the geometrical shape of which is a trapezoid, can be pushed into the proper position within the setting space of the machine heads and the extent to which this trapezoid may be introduced into the machine may also be regulated by a setting edge at the rear of the machine, or this may be made to depend upon the sight of the operator. The machine may also be provided with a lighting device adapted to project a beam upon a point on the trapezoid exactly mid-way between the points at which the fastening elements are to be set and thereby aid in the properly positioning of the fabric for receiving the setting elements.

In setting, for example, stud fastener elements on an overall bib of the type hereinbefore specified, the operator will line up the light beam with the center line of the bib (usually readily ascertainable by the central stitching thereof) and line up the top of the bib with an adjustable set edge at the rear of the gauge table, whereupon the two points on the bib at which the fastener elements are to be secured will be definitely fixed. The invention also contemplates having one of the machine heads adjustable relatively to the other so that the distance between the setting stations can be readily and accurately changed with but little effort. By a similar mode of procedure a pair of socket fastener elements can be attached in spaced relation on the pocket of the overall with the spacing between the socket elements absolutely the same as the spacing between the stud elements on the bib.

The pocket proper may then be secured to the bib by first snapping the socket elements of the pocket onto the stud elements of the bib, thereby definitely fixing the relation of the pocket to the bib, after which the edges of the pocket, in such fixed relation, may be secured by stitching to the bib with a minimum of difficulty.

The invention will be better understood from the detailed description which follows, when considered in connection with the accompanying drawings, wherein we have illustrated certain preferred embodiments of our invention, and wherein:

Figure 1 is a front elevation of a duplex snap fastener attaching machine embodying our invention, certain parts thereof being shown in section.

Fig. 2 is a top plan view of the machine shown in Fig. 1 with certain parts broken away to better illustrate the construction thereof.

Fig. 3 is a section taken along the plane of the line 3—3 of Fig. 2.

Fig. 5 is a top plan view of the type of machine shown in Fig. 4, and specifically showing the operating table and adjustable means forming part of our invention.

Fig. 6 is a section taken substantially along the line 6—6 of Fig. 5.

Fig. 7 is a fractional plan view of an overall bib having spaced fastening elements secured thereto by one of the machines of our invention.

Fig. 8 is a plan view of a pocket member having fastening elements secured thereto by one of the machines of our invention.

Fig. 9 is an assembly of the pocket element on the bib and showing the manner of completing an overall pocket construction contemplated by the present invention.

Figure 4:
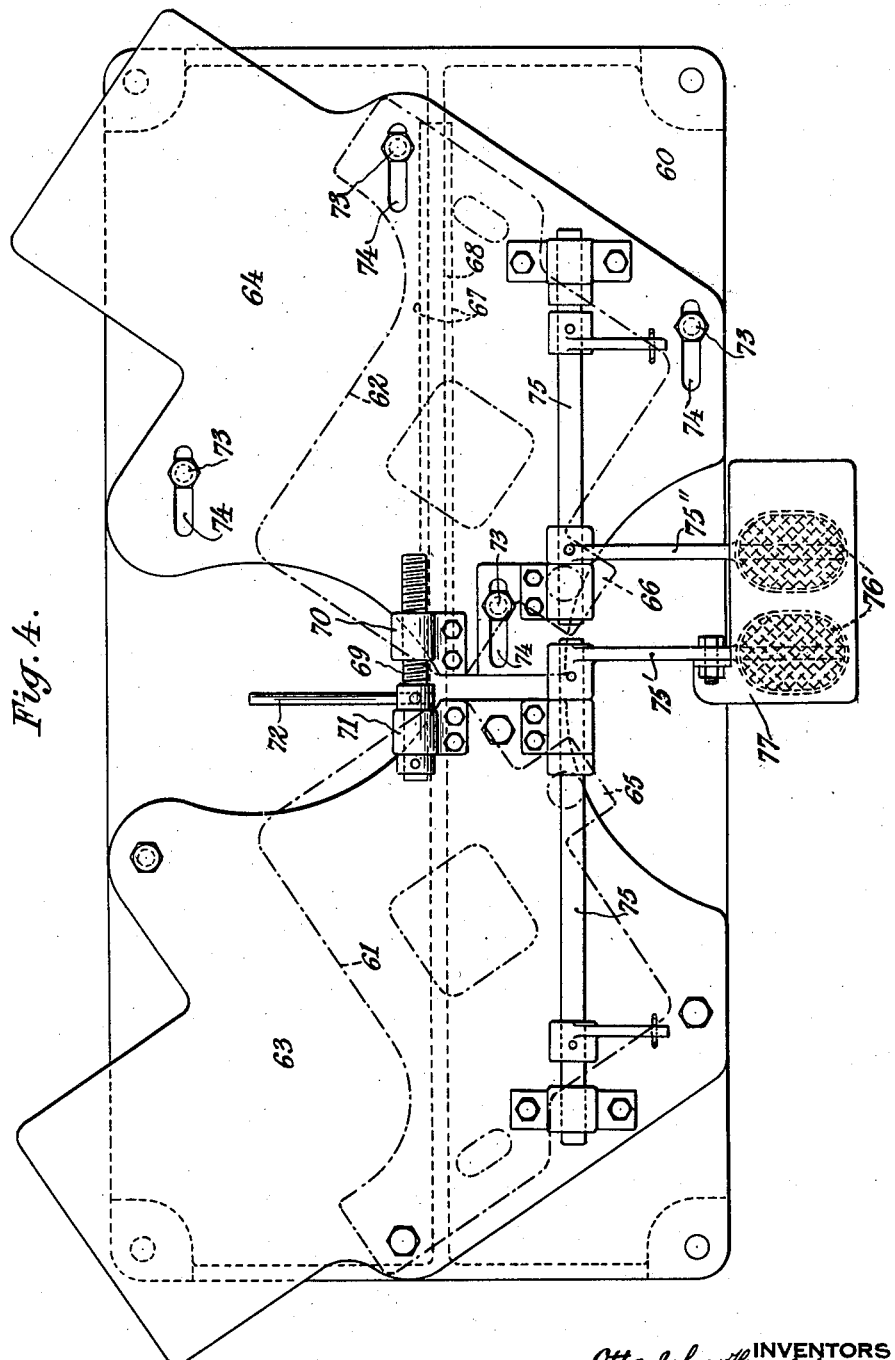
Fig. 4 is a top plan view of a modified form of the machine embodying our invention, with specific regard to the novel means for laterally adjusting one of the machine heads.

Referring first to Figs. 1 and 2 of the drawings, we have shown our invention as applied to machines for attaching snap fastener elements to fabrics, which machines may be of any approved design and construction and embodying the features and operative parts disclosed in the following patents: Warner et al. No. 1,499,270, June 24, 1924, and Warner, 1,575,595, March 2, 1926.

In its broad concept our invention comprises two fastener setting heads with their associated parts so coordinated for simultaneously operating the plungers of said setting heads, and at least one of the setting heads being adjustable laterally with respect to the other to selectively vary the distance between the setting anvils of said heads. The machine shown in Figs. 1 to 3, subject to the known instrumentalities employed in machines of this character, may be said to consist of a pair of standards 10, upon the tops of which is mounted a table 11 having, in turn, mounted thereon setting head units consisting of pedestals 12 and 13 supporting respectively setting heads 15 and 16. In all major respects the pedestals 12 and 13 with their setting heads, are identical, and are mounted with the axes of their setting stations in parallel, but as will be apparent, said setting heads are disposed 180° apart with relation to one another. Preferably, one of the pedestals, for example, pedestal 13, is fixed upon the table 11 by having the pedestal base 17 secured to the table by means of bolts 18, and the other pedestal 12 is mounted on the table for adjustability laterally with respect to the pedestal 13. To provide for this adjustability the base 19 of the pedestal 12 is slidably mounted on the table between a pair of guides or tracks 20, 21. For moving the pedestal toward and away from the pedestal 13 so as to selectively adjust the distance between the axes of their setting, there is mounted on the base 19 a screw-threaded bearing 22 within which engages an adjusting screw 23, one end of which extends through a bearing 24 fixed on the table 11. The end of the adjusting screw which extends through the bearing 24 is provided with a pair of fixed collars 25 and 26 to prevent longitudinal movement of the screw with respect to the bearing 24 as the screw is turned on its axis by an operating handle 27 which is detachably mounted in the fixed collar 26. It will accordingly be apparent that as the screw 23 is turned by the handle 27 it will draw the pedestal 12 toward, or move it away from, the pedestal 13. To hold pedestal 12 in any position to which it has been adjusted, the base of the pedestal is provided with clamping bolts 28 extending into the table 11, and the base of the pedestal is provided with parallel longitudinal slots 29 for permitting adjustable movement within the range of the length of the slots.

Mounted on the tops 30 and 31, respectively, of the pedestals 12 and 13 are forwardly-extending lugs 32, and engaging in each of said lugs is a clamping bolt 33. Cooperating with the clamping bolts 33 is a bridge or bracket 34 having a flat top portion 35 and aligned oppositely-extending flat end portions 36, the latter being each formed with a longitudinal slot 37 through which the bolts 33 extend and through the medium of which the bracket ends 36 may be rigidly clamped upon the lugs 32. Rigidly mounted upon the bracket 34 through the medium of screws 38 is a work table 39 which has a reduced intermediate portion 40 extending between the setting stations of the setting heads, and an enlarged portion 41 rearwardly of said stations. The portion 41 of the work table is formed with a pair of parallel slots 42, and engaging through said slots is a pair of screws 43 carried by a gauge bar 44 for adjusting the latter longitudinally of the work table. The gauge bar 44 is adapted to be held in adjusted position by wing nuts 45 engaging the screws 43 and bearing against the underside of the table. The gauge bar 44 is of angular cross-section and has an upstanding and somewhat rearwardly-directed flange 46, and is preferably provided on its front face exactly midway between the ends of said bar with a visible index means, such as 47, which may be in the nature of a vertical scored line or lines or may consist of a vertical slot or groove in said flange which may be filled with an element of distinctly contrasting color with respect to the flange. It is also preferable that the main or forward portion of the work table 39 be provided with visible index means, such as 48, which is in alignment with the visible index 47 and likewise may be constituted in a manner analogous to the index 47. The functions of the gauge bar 44 and the visible indexes 47 and 48 will presently be made apparent.

Each of the setting heads 15 and 16 may have its setting plunger and anvil (not shown) independently operable, if desired, from a treadle 49 mounted on a shaft 50 disposed slightly above the floor upon which the machine rests and through a rocking lever 50'; a stirrup 51 and other suitable instrumentalities (not shown). It is preferable, however, that the plungers of both setting heads be simultaneously operable, and to accomplish this, both treadles 49 may be connected together by a connecting plate 52 so that foot pressure thereon, or upon either treadle 49 will simultaneously rock both levers 50' to operate the stirrups 51 and the parts controlled thereby.

In Fig. 4 we have shown the invention as applied to fastener attaching machines which are not of identical design as are the setting heads 15 and 16, but on the contrary are what might be termed right and left hand types of machines each of which has its respective parts in substantially the relation to one another as an object has to its mirror image. These machines, which are mounted on a table 60, may be said to comprise setting heads 61 and 62, respectively shown in dot and dash outlines mounted on pedestals having bases 63 and 64, respectively, the base 63 being fixedly mounted upon the table, while the base 64 is mounted for lateral adjustability on the table. The setting heads 61 and 62, have noses 65 and 66, respectively, disposed at an angle to one another with the nose 66 adjustable toward, and away from, the nose 65 in a common vertical plane. To provide for this adjustability and to insure a proper guiding of the head 62, the base 64 of the pedestal on which said head is mounted is formed on its under face with a groove 67 within which slidably engages a tongue 68 formed on the table 60. For moving the base 64, an adjusting unit comprising a screw 69, bearings 70 and 71, and an operating handle 72, in all respects similar to the parts 22 to 27 hereinbefore described, may be employed, and for holding the setting head in its adjusted position, clamping bolts 73 engaging in the table 60 and extending through longitudinal parallel slots 74 in the pedestal base may be employed. In a manner quite analogous to that hereinbefore described with respect to Fig. 1, the operating mechanism of both plunger heads may be simultaneously operated through rocking levers 75', 75", mounted on shafts 75 adapted to be rocked by downward pressure upon a treadle plate 77 mounted over treadles 76, said treadle plate 77 being pivotally bolted to rocking lever 75' for movement into inoperative position so that either treadle 76 may be independently operated.

In Figs. 5 and 6 we have shown a work table and guide means attachments for the machine assembly disclosed in Fig. 4 for definitely locating the points on the fabric at which the fastening elements are to be secured. These means comprise a flat work table 78 of substantially rectangular configuration having at its rear edge cut-out portions 79 and 80 for clearing the noses 65 and 66 of the setting heads, and a projecting tongue 81 extending between said noses. The work table 78 is mounted on a bridge or bracket member 82 having an outwardly-extending flange 83 at each end thereof resting on a supporting plate 85, one end of which is secured by fastening elements to an arm 86 extending from, and supported by, the base of the setting head 61, while the other end thereof rests upon a similar arm 87 secured to, and extending from, the base of the setting head 62. The top face of the supporting plate 85 is formed with depressed portions 88 into which the ends 83 of the bracket seat and are guided, and said depressed portions are further formed with longitudinally aligned slots 89 through which extend clamping thumb screws 90 carried by the flanges 83 of the bracket member to secure said bracket member in longitudinally adjusted position on the supporting plate 85.

The top face of the work table 78 is provided with a central guide or index 91 of any preferred or desired construction, and as herein shown consists of a filling of colored material disposed in a central groove 92 formed in the top face of the work table. Lateral adjustability of the bridge 82 upon the supporting plate 85 will permit setting the guide or index 91 on the work table 78 equidistant from the setting stations 93 and 94 of the setting heads 61 and 62, respectively.

Mounted on lugs 65' and 66' projecting from the base of the setting heads 65 and 66 are slotted clips 95, which have upwardly extending pins 96 extending through, and adjustable longitudinally in the slots therein. The pins intermediate their ends have an enlarged shoulder 96', and below said shoulder are screw-threaded and engaged by a clamping nut 97 to hold the pins in adjusted position within the slot in the clips. The pins 96 function as stops for engaging the edge of the fabric upon which fastening elements are to be secured, and the adjustment of said pins is such that they will control the distance from the top edge of the fabric inwardly at which the fastening elements are to be secured, it being observed that the pins 96 are herein shown as set in alignment a fixed distance rearwardly of a line $x-x$ joining the setting stations 93 and 94.

In Figs. 7, 8 and 9, we have shown one type of product with respect to which the present machine mechanism is particularly applicable; Fig. 7 being a fractional plan of a bib portion of an overall; Fig. 8 being a pocket member; and Fig. 9 showing the assembly of the pocket member on the bib portion. As usually constructed, the bib portion 98 is of substantially trapezoid outline and has a straight top edge 99, and is usually formed by sewing together two pieces of fabric with a multiple seam, such as 100. The pocket member 101 is herein shown as of oblong form with parallel top and bottom edges and curved or bowed side edges, and formed of two pieces of fabric joined together by a central multiple seam 102, and a turned back and finished seamed top edge 103.

While either of the two types of setting machines herein disclosed may be used for simultaneously setting a pair of spaced fastening elements on fabrics for varied purposes, the machine illustrated in Figs. 1 to 3 is here shown as equipped for setting stud and post elements on the bib portion of an overall; and the machine illustrated in Figs. 5 and 6 is equipped for setting cap and socket elements on the pocket member of an overall prior to the securing of said pocket member to the bib portion.

In the operation of the machine shown in Figs. 1 to 3 for setting the stud and post elements on the bib portion of the overall, the setting head 15 is first adjusted on the table 11 so as to definitely fix the distance between the setting stations on the heads 15 and 16 by adjustment of the screw 23 and the subsequent tightening down of the clamping bolts 20. The work table 39 is then laterally adjusted through the medium of the bolts 33 to bring the visible index 48 equidistant from the setting stations. The gauge bar 44 is then set to engage the top edge of the trapezoid bib portion 98 when supported on the table, and the seams 100 on the bib are then brought into alignment with the index 47 on the gauge bar and the index 48 on the work table, thereby definitely fixing the points on the bib portion at which the fastening elements are to be attached. Each setting head will intermittently feed post and stud elements to their respective setting stations, and upon pressing downwardly on a treadle 49 or the connecting plate 52, the plungers of the setting heads will be brought into operation to attach a stud and a post to the bib portion at each setting station. The bib portion is then removed and the operation repeated on other bib portions.

In a somewhat analogous manner the cap and socket elements are attached adjacent the top edge of the pocket member 101 on the machine shown in Figs. 5 and 6. In accomplishing this the setting stations 93 and 94 will be adjusted so as to locate them exactly the same distance apart as the setting stations on the machines of Figs. 1 to 3, by moving of the setting head 62 in a manner analogous to that described with respect to the movement of setting head 15; this being done, the work table 78 is adjusted laterally along the supporting plate 85 so as to bring the indexing element 81 equidistant from the setting stations 93 and 94. The pins 96 in the slotted clips 95 will then be adjusted to fix the distance inwardly from the top edge of the pocket member at which the cap and socket elements are to be attached. The pocket member 101 will then be presented on the table 78 so that the top edge 103 engages the pins 96 and the seams 102 coincide with the index 81, whereupon, by pressing down on the treadle 76 a pair of cap and socket elements, which will be fed to the respective setting stations, will be simultaneously attached to the pocket member.

Should it be found necessary to provide additional means for truly centering the pocket member or the bib portion preliminary to attaching the fastening elements thereon, a spot light 105, as shown in Figs. 1 and 5, may be provided, which is adjustable to throw a spot of light 106 upon the table exactly midway between the setting stations, which light spot will be focused on a predetermined seam connecting the bib portion sections or the pocket sections.

The stud and post elements being secured to the bib portion, and the cap and socket elements being secured to the pocket member exactly the same distance apart, the pocket member is thereupon secured through its fastening elements to the fastening elements on the bib portion, and with the parts in this relation the pocket is then sewed onto the bib portion. This method of procedure absolutely insures proper complemental engagement of the fastening elements on the pocket member with those on the bib portion and overcomes any possibility of puckering of either the pocket member or bib portion when said parts are connected together. It not only insures a perfect pocket formation, but also accomplishes this in a more economical manner than has heretofore been possible.

While our invention has been hereinbefore described with specific relation to the securing of an overall pocket member on an overall bib portion, it will be apparent that the concept underlying the invention is susceptible of application to any character of device where cooperation between definitely spaced fastening elements on two fabric members is involved. It will also be understood that while we have shown and described our invention as applied to standard types of fastener element setting machines with but slight modification thereto, the invention is not to be construed as limited to the specific types of machines illustrated, since it may be applied to other existing or newly developed types of machines within the range of engineering skill, without departing from the spirit of the invention.

What we claim is:

1. A duplex snap fastener attaching mechanism comprising two fastener setting heads with associated parts, means for operating said setting heads, each setting head having a projecting nose containing a setting station, a base extending laterally beyond the projecting nose and an anvil in alignment with said nose, the heads being so related that the noses thereof are directed toward each other with the axes of their setting stations parallelly disposed, and at least one of said setting heads being adjustable laterally with respect to the other to selectively vary the distance between the setting stations while maintaining said parallel axial relationship therebetween.

2. A duplex snap fastener attaching mechanism according to claim 1, wherein the projecting noses on the setting heads are directed at an angle toward each other.

3. A duplex snap fastener attaching mechanism comprising two setting units having setting stations the axes of which are disposed in parallel relation, each setting unit comprising a setting head having a nose through which an axis of a setting station extends and an anvil in alignment with said head, the heads being so related that the noses thereof are directed toward each other, means for adjusting one of the setting units laterally with respect to the other for selectively varying the distance between the setting stations while maintaining the axes of said setting stations in parallel relation, a support for a fabric to which the fastener elements are to be attached, and gauge means for promoting the definite positioning of the fabric to insure the fastening elements being secured thereon at the proper spaced apart points, said support being adjustable independently of the adjustability of the setting units.

4. A duplex snap fastener attaching mechanism according to claim 3, wherein the gauge means are on the support.

5. A duplex snap fastener mechanism according to claim 3, wherein the gauge means comprise an adjustable light source for directing a spot of light onto the support in definite spaced relation to the setting stations of said setting units.

6. A duplex snap fastener mechanism according to claim 3 wherein the fabric support is carried by the setting units.

OTTO JOHN HUELSTER.
JEROME GANIERRE WOLFF.